United States Patent
Bastiaens et al.

(10) Patent No.: US 6,204,313 B1
(45) Date of Patent: Mar. 20, 2001

(54) FLAME RETARDANT POLYMER BLENDS, AND METHOD FOR MAKING

(75) Inventors: Jos Herman Peter Bastiaens, Bergen op Zoom (NL); John Robert Campbell, Clifton Park, NY (US); Luc Carlos Govaerts, Hoogstraten (BE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/404,456

(22) Filed: Jul. 8, 1999

Related U.S. Application Data

(63) Continuation-in-part of application No. 09/235,678, filed on Jan. 22, 1999, now abandoned.

(51) Int. Cl.$^7$ .............................. C08K 5/52; C08K 5/5399
(52) U.S. Cl. ..................... 524/100; 524/586; 524/513; 524/537
(58) Field of Search .................... 524/566, 100, 524/513, 537

(56) References Cited

U.S. PATENT DOCUMENTS

| | | |
|---|---|---|
| 2,682,521 | 6/1954 | Coover, Jr. . |
| 3,169,121 * | 2/1965 | Goldberg .............................. 528/173 |
| 3,868,376 | 2/1975 | Hotten . |
| 3,937,765 | 2/1976 | Toy et al. . |
| 4,506,065 * | 3/1985 | Miller et al. ........................... 528/194 |
| 4,701,566 * | 10/1987 | Faler et al. ............................ 568/719 |
| 5,369,172 * | 11/1994 | Morgan et al. ........................ 525/67 |
| 5,658,974 * | 8/1997 | Fuhr et al. ............................ 524/127 |

FOREIGN PATENT DOCUMENTS

| | | |
|---|---|---|
| 1694354 | 6/1971 | (DE) . |
| 2505326 | 8/1975 | (DE) . |
| 171730 | 2/1986 | (EP) . |
| 372324 | 6/1990 | (EP) . |
| 728811 | 8/1996 | (EP) . |
| 1517652 | 7/1978 | (GB) . |
| 55135158 | 10/1980 | (JP) . |
| 5-156116A * | 6/1993 | (JP) . |
| 7-41655 | 2/1995 | (JP) . |
| 7-70158 | 3/1995 | (JP) . |
| 10-175985A * | 6/1998 | (JP) . |
| WO 93/22373 | 11/1993 | (WO) . |
| WO 93/22382 | 11/1993 | (WO) . |
| WO 99/07779 | 2/1999 | (WO) . |

* cited by examiner

*Primary Examiner*—Robert Dawson
*Assistant Examiner*—Kuo-Liang Peng
(74) *Attorney, Agent, or Firm*—S. Bruce Brown; Noreen C. Johnson

(57) ABSTRACT

Flame retardant blends comprising at least one polyestercarbonate, at least one addition polymer such as a styrene-acrylonitrile or ABS copolymer, and at least one phosphoryl flame retardant have high temperature stability properties superior to those of similar blends containing polycarbonate in place of polyestercarbonate.

76 Claims, No Drawings

FLAME RETARDANT POLYMER BLENDS, AND METHOD FOR MAKING

This application is a continuation-in-part of application Ser. No. 09/235,678, filed Jan. 22, 1999 now abandoned.

BACKGROUND OF THE INVENTION

This invention relates to blends of thermoplastic polymers, and more particularly to flame retardant blends having improved high temperature properties.

Improvement of the flame retardant properties of thermoplastic polymers such as polycarbonates has long been a goal of polymer compounders. Compounds containing phosphorus have been used in compositions with thermoplastic polymers to improve their flame resistance properties. Among the phosphorus compounds useful for this purpose are the bis(diaryl phosphate) esters of dihydroxyaromatic compounds, as illustrated by resorcinol bis(diphenyl phosphate), hydroquinone bis(diphenyl phosphate), and bisphenol A bis(diphenyl phosphate). Certain water soluble phosphoramides have also been used in the textile industry as flame retardant finishes for fabrics.

Phosphorus-containing compounds, however, often have undesirable effects on other physical properties of thermoplastic polymers. For example, phosphorus-containing compounds frequently have undesirable effects on the high temperature properties of polycarbonate and polycarbonate-containing blends, especially those blends also containing addition polymers such as acrylonitrile-butadiene-styrene copolymers (hereinafter referred to as "ABS copolymers"). Said undesirable effects may be demonstrated by a pronounced decrease in glass transition temperature (Tg) of one or more polymer phases. In addition, other physical properties of the blends, such as ductility, are sometimes adversely affected and may require improvement.

There are increasing demands from key industries, such as the electronics and computer industries, for polymer compositions possessing both flame retardant properties and higher heat resistance. Such compositions must also retain other key physical properties, such as adequate flow and impact strength, for applications such as computer housings, computer monitor housings, and printer housings. Another increasing demand is for materials that are rated in the Underwriter's Laboratory UL-94 test protocol as V-0, V-1, or V-2. It is therefore apparent that new resin compositions that meet these and other demands continue to be sought.

SUMMARY OF THE INVENTION

The present invention meets that above-described needs by providing resin compositions comprising the following and any reaction products thereof:

a) at least one polyestercarbonate comprising structural units of the formula I:

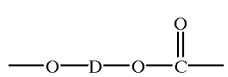
(I)

wherein D is a divalent aromatic radical; and repeating or recurring structural units of the formula II:

—O—R1—O—D— (II)

wherein D has the meaning previously ascribed to it and R1 is at least one divalent moiety selected from those of the formulae III ans IV

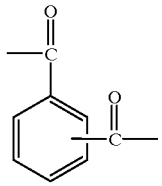
(III)

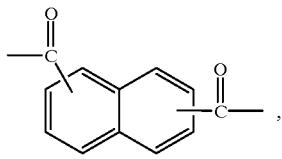
(IV)

b) at least one addition polymer; and c) at least one phosphoryl compound of the formula V:

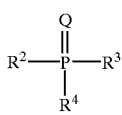
(V)

wherein Q is oxygen or sulfur; and R2, R3, and R4 are each independently an alkyloxy, alkylthio, aryloxy, or arylthio residue, or an aryloxy or arylthio residue containing at least one alkyl or halogen substitution, or mixture thereof; or an amine residue.

The present invention also provides articles made from the resin compositions. Furthermore, the present invention provides methods to make resin compositions having improved heat and/or processability over compositions known in the art.

DETAILED DESCRIPTION OF THE INVENTION

In one embodiment, the composition of the present invention comprises a polyestercarbonate comprising structural units of the formula I:

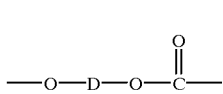
(I)

wherein D is a divalent aromatic radical; and repeating or recurring units of the formula II:

—O—R$^1$—O—D— (II)

wherein D has the meaning previously ascribed to it and R$^1$ is at least one divalent moiety selected from those of the formulae III and IV:

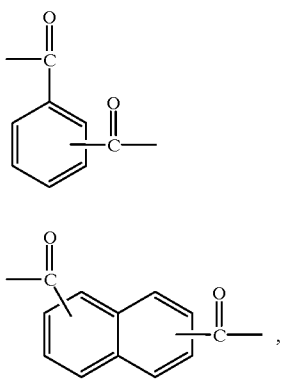

(III)

(IV)

The polyestercarbonates which find use in the instant invention and the methods for their preparation are well known in the art as disclosed in, for example, U.S. Pat. Nos. 3,030,331; 3,169,121; 3,207,814; 4,194,038; 4,156,069; 4,238,596; 4,238,597; 4,487,896; 4,506,065, and in copending application Ser. No. 09/416,529, filed Oct. 12, 1999, and assigned to the same assignee as the instant application, all of which are hereby incorporated by reference. Among the properties characterizing these polymers is a relatively high distortion temperature under load (DTUL) as well as a relatively high impact strength as measured by a notched Izod test protocol.

The polyestercarbonates may generally be termed copolyesters containing carbonate groups, carboxylate groups, and aromatic carbocyclic groups in the polymer chain, in which at least some of the carboxylate groups and at least some of the carbonate groups are bonded directly to ring carbon atoms of the aromatic carbocyclic groups. These polyestercarbonates are, in general, prepared by reacting at least dihydric phenol, at least one difunctional carboxylic acid or reactive derivative of the acid such as the acid dihalide, and a carbonate precursor.

Suitable dihydric phenols for preparing polyestercarbonates include those represented by the formula VI:

HO—D—OH (VI)

wherein D is a divalent aromatic radical. Preferably, D has the structure of formula VII;

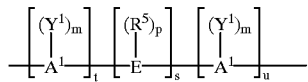

(VII)

wherein A represents an aromatic group such as phenylene, biphenylene, naphthylene, etc. E may be an alkylene or alkylidene group such as methylene, ethylene, ethylidene, propylene, propylidene, isopropylidene, butylene, butylidene, isobutylidene, amylene, amylidene, isoamylidene, etc. Where E is an alkylene or alkylidene group, it may also consist of two or more alkylene or alkylidene groups connected by a moiety different from alkylene or alkylidene, such as an aromatic linkage; a tertiary amino linkage; an ether linkage; a carbonyl linkage; a silicon-containing linkage; or a sulfur-containing linkage such as sulfide, sulfoxide, sulfone, etc.; or a phosphorus-containing linkage such as phosphinyl, phosphonyl, etc. In addition, E may be a cycloaliphatic group (e.g., cyclopentylidene, cyclohexylidene, 3,3,5-trimethylcyclohexylidene, methylcyclo-hexylidene, 2-[2.2.1]-bicycloheptylidene, neopentylidene, cyclopentadecylidene, cyclododecylidene, adamantylidene, etc.); a sulfur-containing linkage, such as sulfide, sulfoxide or sulfone; a phosphorus-containing linkage, such as phosphinyl, phosphonyl; an ether linkage; a carbonyl group; a tertiary nitrogen group; or a silicon-containing linkage such as silane or siloxy. $R^5$ represents hydrogen or a monovalent hydrocarbon group such as alkyl, aryl, aralkyl, alkaryl, or cycloalkyl. $Y^1$ may be an inorganic atom such as halogen (fluorine, bromine, chlorine, iodine); an inorganic group such as nitro; an organic group such as $R^5$ above, or an oxy group such as OR; it being only necessary that $Y^1$ be inert to and unaffected by the reactants and reaction conditions used to prepare the polyestercarbonate. The letter m represents any integer from and including zero through the number of positions on $A^1$ available for substitution; p represents an integer from and including zero through the number of positions on E available for substitution; t represents an integer equal to at least one; s is either zero or one; and u represents any integer including zero.

In the dihydric phenol compound in which D is represented by formula VII above, when more than one Y substituent is present, they may be the same or different. The same holds true for the $R^5$ substituent. Where s is zero in formula VII and u is not zero, the aromatic rings are directly joined with no intervening alkylidene or other bridge. The positions of the hydroxyl groups and $Y^1$ on the aromatic nuclear residues $A^1$ can be varied in the ortho, meta, or para positions and the groupings can be in vicinal, asymmetrical or symmetrical relationship, where two or more ring carbon atoms of the hydrocarbon residue are substituted with $Y^1$ and hydroxyl groups.

Some illustrative, non-limiting examples of dihydric phenols of formula VI include the dihydroxy-substituted aromatic hydrocarbons disclosed by name or formula (generic or specific) in U.S. Pat. No. 4,217,438, which is incorporated herein by reference. Some preferred examples of dihydric phenols include 4,4'-(3,3,5-trimethylcyclohexylidene) diphenol; 2,2-bis(4-hydroxyphenyl)propane (commonly known as bisphenol A); 2,2-bis(4-hydroxy-3,5-dimethylphenyl) propane; 2,4'-dihyroxydiphenylmethane; bis(2-hydroxyphenyl)methane; bis(4-hydroxyphenyl) methane; bis(4-hydroxy-5-nitrophenyl)methane; bis(4-hydroxy-2,6dimethyl-3-methoxyphenyl)methane; 1,1-bis(4-hydroxyphenyl)ethane; 1,1-bis(4-hydroxy-2-chlorophenyl) ethane; 2,2-bis(3-phenyl-4-hydroxyphenyl)-propane; bis(4-hydroxyphenyl)cyclohexylmethane; 2,2-bis(4-hydroxyphenyl)-1-phenylpropane; resorcinol; $C_{1-3}$ alkyl-substituted resorcinols.

Suitable dihydric phenols also include those containing spirobiindane structural units such as represented by the formula VIII:

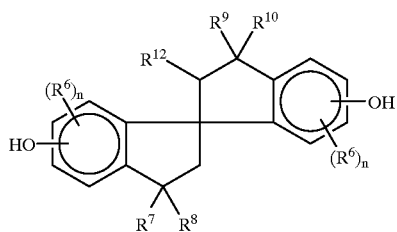

(VIII)

wherein each $R^6$ is independently selected from monovalent hydrocarbon radicals and halogen radicals; each $R^7$, $R^8$, $R^9$, and $R^{10}$ is independently $C_{1-6}$ alkyl; each $R^{11}$ and $R^{12}$ is independently H or $C_{1-6}$ alkyl; and each n is independently selected from positive integers having a value of from 0 to 3 inclusive. The monovalent hydrocarbon radicals represented by $R^6$ include alkyl radicals, cycloalkyl radicals, aryl radicals, aralkyl radicals, and alkaryl radicals. Alkyl radicals represented by $R^6$ are preferably those containing from 1 to about 12 carbon atoms, and include branched alkyl radicals and straight chain alkyl radicals. Some illustrative non-limiting examples of these alkyl radicals include methyl, ethyl, propyl, isopropyl, butyl, tertiary-butyl, pentyl, neopentyl, and hexyl. Cycloalkyl radicals represented by $R^6$ are preferably those containing from 3 to about 12 ring carbon atoms. Some illustrative non-limiting examples of these cycloalkyl radicals include cyclobutyl, cyclopentyl, cyclohexyl, methylcyclohexyl, cycloheptyl. Aryl radicals represented by $R^6$ are preferably those containing from 6 to 12 ring carbon atoms. Some illustrative non-limiting examples of these aryl radicals include phenyl, biphenyl, naphthyl. Preferred aralkyl and alkaryl radicals represented by $R^6$ are those containing from 7 to about 14 carbon atoms. These include, but are not limited to, benzyl, ethylphenyl, phenylbutyl, phenylpropyl, propylphenyl, and phenylethyl. The preferred halogen radicals represented by $R^6$ are fluorine, chlorine and bromine.

In the dihydric phenol compound of formula VIII when more than one $R^6$ substituent is present they may be the same or different. The relative positions of the hydroxyl groups and $R^6$ on the aromatic nuclear residues may be varied in the ortho or meta positions. The position of each hydroxy group is independently at any unsubstituted site on each of the aromatic rings. More preferably each hydroxy group is independently in positions 5 or 6 and 5' or 6' of each aromatic ring. Most preferably each hydroxy group is in position 6 and 6' of each aromatic ring.

Preferably, each $R^6$ is independently selected from chlorine, bromine, and lower alkyl radicals containing from 1 to about 5 carbon atoms, each $R^7$, $R^8$, $R^9$, and $R^{10}$ is independently $C_{1-6}$ alkyl; each $R^{11}$ and $R^{12}$ is independently H or $C_{1-6}$ alkyl; and each n is independently 0 to 3. More preferably, each $R^6$ is independently selected from chlorine and lower alkyl radicals containing from 1 to about 3 carbon atoms, each $R^7$, $R^8$, $R^9$, and $R^{10}$ is independently $C_{1-2}$ alkyl; each $R^{11}$ and $R^{12}$ is independently H or $C_{1-2}$ alkyl; and each n is independently 0 to 2. Still more preferably, each $R^7$, $R^8$, $R^9$, and $R^{10}$ is methyl; each $R^{11}$ and $R^{12}$ is H; and each n is 0.

The spiro dihydric phenols of formula VIII are compounds that are known in the art and are commercially available or may be readily prepared by known methods.

Methods of preparation include those described in U. S. Pat. No. 4,701,566; and by R. F. Curtis and K. O. Lewis in Journal of the Chemical Society (England), 1962, p. 420; and by R. F. Curtis in Journal of the Chemical Society (England), 1962, p. 417. In one illustrative, non-limiting example these spiro dihydric phenols may be conveniently prepared by (i) reacting two moles of a phenolic compound with one mole of a carbonyl-containing compound such as acetone, and (ii) thereafter coreacting 3 moles of the product of (i) under acidic conditions to form the spiro dihydric phenol and 4 moles of a phenolic compound. The acids which may be utilized in (ii) can include such acids as anhydrous methane sulfonic acid, anhydrous hydrochloric acid, and the like.

The most preferred spiro dihydric phenol for forming polyestercarbonates suitable for use in the present invention is 6,6'-dihydroxy-3,3,3',3'-tetramethyl-1,1'-spirobiindane ("SBI"), in which n in formula VIII is 0 and the linkages with the rest of the polymer molecule are in a specific position on the aromatic rings.

In the preparation of suitable polyestercarbonates the dihydric phenols described above may be used alone or as mixtures of two or more different dihydric phenols. For reasons of availability and particular suitability for the purposes of this invention, a preferred dihydric phenol is 2,2-bis(4hydroxyphenyl)propane ("BPA"), in which D in formula VII is bis(4-phenyl) isopropylidene.

In general, any difunctional carboxylic acid or a corresponding reactive derivative such as the acid dihalide can be conventionally used in the preparation of polyestercarbonates for the present invention. Typically, the carboxylic acids which may be used are aliphatic dicarboxylic acids, aliphatic-aromatic dicarboxylic acids, or aromatic dicarboxylic acids. The aromatic dicarboxylic acids or their reactive derivatives such as the aromatic acid dihalides are particularly preferred, as they produce aromatic polyestercarbonates which are most useful in the practice of the present invention. These dicarboxylic acids may be represented by the general formula IX:

HOOC—$R^{13}$—COOH (IX)

wherein $R^{13}$ represents an aromatic radical such as phenylene, naphthylene, biphenylene, substituted phenylene, etc.; two or more aromatic groups connected through non-aromatic linkages such as those defined by E in formula VII; or an aralkyl radical such as tolyl, xylyl, etc. or an alkaryl radical such as benzyl, etc. Particularly preferred aromatic dicarboxylic acids for preparation of polyestercarbonates are those comprising at least one dicarboxylic acid of formulas X and XI:

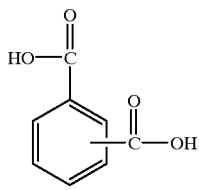

(X)

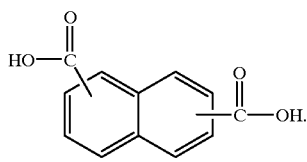
(XI)

Some illustrative, non-limiting examples of suitable aromatic dicarboxylic acids include phthalic acid, isophthalic acid, terephthalic acid, homophthalic acid, o—, m—, and p-phenylenediacetic acid; and the polynuclear aromatic acids such as diphenic acid, 1,4-naphthalene dicarboxylic acid, 2,6-naphthalene dicarboxylic acid, and the like. These acids may be used either individually, or as a mixture of two or more different acids in the preparation of suitable polyestercarbonates.

The carbonate precursor may be a carbonyl halide, a carbonate ester or a haloformate. The carbonyl halides which can be employed herein are carbonyl chloride, carbonyl bromide and mixtures thereof. Typical of carbonate esters which may be employed herein are diphenyl carbonate, di(halophenyl)carbonates, such as di(chlorophenyl)carbonate, di(bromophenyl)carbonate, di(trichlorophenyl)carbonate, di(tribromophenyl)carbonate, etc.; di(alkylphenyl)carbonates such as di(tolyl)carbonate, etc., di(naphthyl)carbonate, di(chloronaphthyl)carbonate, phenyl tolyl carbonate, chlorophenyl chloronaphthyl carbonate, etc., or mixtures thereof. The haloformates suitable for use herein include bishaloformates of dihydric phenols (such as bischloroformates of hydroquinone, bisphenol A, etc.) or glycols (such as bishaloformates of ethylene glycol, neopentyl glycol, polyethylene glycol, etc.). Carbonyl chloride, also known as phosgene, is preferred.

The polyestercarbonates of the instant invention may be prepared by known processes such as interfacial polymerization or phase boundary separation, transesterification, solution polymerization, melt polymerization, transesterification, and the like. Various prior art polymerization processes are disclosed, for example, in U.S. Pat. Nos. 3,030,331; 3,169,121; and 3,207,814; and in copending application Ser. No. 09/416,529,. filed Oct. 12, 1999. Although the processes may vary, several of the preferred processes typically involve dissolving or dispersing the reactants in a suitable water-immiscible solvent medium, and contacting the reactants with a carbonate precursor, such as phosgene, in the presence of a suitable catalyst and an aqueous caustic solution under controlled pH conditions. The most commonly used water-immiscible solvents include methylene chloride, 1,2-dichloroethane, chlorobenzene, toluene, and the like.

In an alternative method of preparation at least one dihydric phenol is reacted with at least one dicarboxylic acid or corresponding reactive derivative such as bis(acid halide) under alkaline conditions in a molar ratio such as to provide a hydroxy-terminated polyester oligomer. The degree of polymerization (DP) of the polyester oligomer is at least about 4, preferably at least about 10, more preferably at least about 20, and most preferably about 30 to about 150. The oligomer is then treated with dihydric phenol and carbonate precursor by standard methods to form a polyestercarbonate in which the DP of the carbonate blocks is generally at least about 10, preferably at least about 20, and most preferably about 50–200. In a preferred embodiment the dihydric phenol is resorcinol, the dicarboxylic acid source is a mixture of iso- and terephthaloyl chlorides (typically in an iso:tere ratio of about 5:95 to about 95:5), and the carbonate precursor is phosgene.

A molecular weight regulator, that is a chain stopper, is generally added to the reactants prior to or during contacting them with a carbonate precursor. Useful molecular weight regulators include, but are not limited to, monohydric phenols such as phenol, chroman-I, para-tertiarybutylphenol, and the like. Techniques for the control of molecular weight are well known in the art and may be used in the present process for controlling the molecular weight of the polyestercarbonate resins.

Advantageously a catalyst is added to the reaction mixture to promote the reaction. Representative catalysts include but are not limited to tertiary amines such as triethylamine, quaternary phosphonium compounds, quaternary ammonium compounds, and the like.

The temperature at which the polymerization reaction proceeds may vary from below 0° C., to above 100° C. Preferably, the temperature of polymerization varies from about −20° C. to about 100° C., and most preferably at temperatures of from about room temperature (25°C.) to about 50°C. Since the reaction is exothermic, the addition rate of carbonyl precursor, such as phosgene, may be used to control the reaction temperature. The amount of carbonyl precursor required will generally depend upon the amount of the dihydric phenols reactant added.

Acid acceptors may also be present during the reaction between dihydric phenols, dicarboxylic acids or their reactive derivatives, and the carbonate precursor. Examples of suitable acid acceptors include tertiary amines, alkali or alkaline earth metal hydroxides, and the like.

The polyestercarbonates which are particularly useful in the practice of the present invention are those derived from bisphenol A; terephthalic acid, isophthalic acid, or a mixture thereof, or terephthaloyl dichloride, isophthaloyl dichloride, or a mixture thereof; and phosgene. When a mixture of either terephthalic acid and isophthalic acid, or terephthaloyl dichloride and isophthaloyl dichloride is utilized, the molar ratio (and weight ratio) of terephthalic units to isophthalic units is from about 5:95 to about 95:5, preferably from about 7:93 to about 50:50. The preferred polyestercarbonates have a weight average molecular weight of about 5,000 to about 100,000, more preferably of about 10,000 to about 65,000, and most preferably about 18,000 to about 36,000.

The proportions of reactants employed to prepare the polyestercarbonate resins will vary in accordance with the proposed use of the blends of the invention containing this product resin. In general, the amount of the ester units of formula II may be from about 10 to about 90 weight percent, relative to the carbonate units of formula I, and preferably about 60 to about 80 weight percent.

A single polyestercarbonate or a mixture of two or more different polyestercarbonates may be employed in the compositions of the present invention. For certain applications it is also contemplated to employ in the compositions a mixture comprising a at least one polyestercarbonate and at least one homopolycarbonate, homopolyester, or mixture thereof. For example, compositions comprising polyestercarbonates derived from bisphenol A-isophthalic/terephthalic acids may for some applications be advantageously combined with BPA homopolycarbonate. Preferably, the weight average molecular weight of the homopolycarbonate ranges from about 5,000 to about 100,000; more preferably from about 10,000 to about 65,000, still more preferably from about 16,000 to about 40,000, and most preferably from about 20,000 to about 36,000. Compositions comprising polyestercarbonates derived from bisphenol A-isophthalic/terephthalic acids may for some applications also be advantageously combined the polyarylate derived from copolymerizing 2:1:1 bisphenol A-isophthalic/terephthalic acids. Mixtures of homopolycarbonate and polyarylate may also be used in compositions containing polyestercarbonate.

In resinous compositions there is often an improvement in melt flow and/or other physical properties when one molecular weight grade of at least one resinous constituent is combined with a relatively lower molecular weight grade of similar resinous constituent. Illustrative, non-limiting examples include compositions containing at least one polycarbonate. For example, in a polycarbonate-containing blend there is often an improvement in melt flow when one molecular weight grade of polycarbonate is combined with a proportion of a relatively lower molecular weight grade of similar polycarbonate. Therefore, the present invention encompasses compositions comprising only one molecular weight grade of a particular resinous constituent and also compositions comprising two or more molecular weight grades of similar resinous constituent. When two or more molecular weight grades of similar resinous constituent are present, then the weight average molecular weight of the lowest molecular weight constituent is about 10% to about 95%, preferably about 40% to about 85%, and more preferably about 60% to about 80% of the weight average molecular weight of the highest molecular weight constituent. In one representative, non-limiting embodiment polycarbonate-containing blends include those comprising a polycarbonate with weight average molecular weight between about 28,000 and about 32,000 combined with a polycarbonate with weight average molecular weight between about 16,000 and about 26,000. When two or more molecular weight grades of similar resinous constituent are present, the weight ratios of the various molecular weight grades may range from about 1 to about 99 parts of one molecular weight grade and from about 99 to about 1 parts of any other molecular weight grades. A mixture of two molecular weight grades of a resinous constituent is often preferred, in which case the weight ratios of the two grades may range from about 99:1 to about 1:99, preferably from about 80:20 to about 20:80, and more preferably from about 70:30 to about 50:50. Since not all manufacturing processes for making a particular resinous constituent are capable of making all molecular weight grades of that constituent, the present invention encompasses compositions comprising two or more molecular weight grades of similar resinous constituent in which each of the similar resins is made by a different manufacturing process. In one particular embodiment the instant invention encompasses compositions comprising a polycarbonate made by an interfacial process in combination with a polycarbonate of different weight average molecular weight made by a melt transesterification process.

The presence of aromatic ester structural units of formula II in a copolymer also containing carbonate structural units of formula I is often observed to increase the Tg of said copolymer compared to the Tg of the corresponding homopolycarbonate containing structural units of formula I alone. For example, polyestercarbonates comprising BPA copolycarbonates containing ester structural units derived from isophthalic/terephthalic acids typically have higher Tg than do the corresponding BPA homopolycarbonates, as is disclosed, for example, in U.S. Pat. No. 4,506,065.

The addition polymer constituent of the blends of the invention may comprise any known addition homopolymer or copolymer. Addition homopolymers include, but are not limited to, homopolymers of unsaturated monomers such as olefins, polar-group-substituted olefins, non-polar-group-substituted olefins, dienes, alkenylaromatic compounds, and the like; and homopolymers of cyclic monomers such as cyclic carbonates, cyclic esters, cyclic amides, cyclic siloxanes, cyclic imides, cyclic etherimides, cyclic ethers, and the like. Addition copolymers include, but are not limited to, copolymers of two or more unsaturated monomers such as olefins, polar-group-substituted olefins, non-polar-group-substituted olefins, dienes, alkenylaromatic monomers, and the like; and copolymers of two or more cyclic monomers such as cyclic carbonates, cyclic esters, cyclic amides, cyclic siloxanes, cyclic imides, cyclic etherimides, cyclic ethers, and the like. Addition copolymers of two or more unsaturated monomers such as two olefin monomers; an olefin monomer and a polar-group-substituted olefin monomer; an alkenylaromatic monomer and a non-polar-group-substituted olefin monomer; and an alkenylaromatic monomer and a polar-group-substituted olefin monomer are preferred. Representative examples of such copolymers include styrene-acrylonitrile copolymers (SAN), and high impact polystyrene (HIPS), a genus of rubber-modified polystyrenes comprising blends and grafts wherein the rubber is a polybutadiene or a rubbery copolymer of about 70–98% styrene and 2–30% diene monomer. Also included among the SAN copolymers are acrylonitrile-butadiene-styrene (ABS) copolymers, which are typically grafts of styrene and acrylonitrile on a previously formed diene polymer backbone (e.g., polybutadiene or polyisoprene).

For the most part, rubber-modified thermoplastic resins based on addition polymers are preferred. Suitable rubber modified thermoplastic resins may comprise a discontinuous elastomeric substrate phase dispersed in a continuous rigid thermoplastic superstrate phase, wherein at least a portion of the rigid thermoplastic phase is chemically grafted to the elastomeric phase.

Suitable materials for use as the elastomeric phase are polymers having a Tg of less than or equal to 25° C., more preferably less than or equal to 0° C., and even more preferably less than or equal to –30° C. As referred to herein, the Tg of a polymer is the Tg value of polymer as measured by differential scanning calorimetry (heating rate 20° C./minute, with the Tg value being determined at the inflection point).

In a preferred embodiment, the elastomer phase comprises a polymer having repeating units derived from one or more ethylenically unsaturated monomers selected from conjugated diene monomers, non-conjugated diene monomers and $C_{1-12}$ alkyl (meth)acrylate monomers Suitable conjugated diene monomers include, e.g., 1,3-butadiene; isoprene; 1,3-heptadiene; methyl-1,3-pentadiene; 2,3-dimethylbutadiene; 2-ethyl-1,3-pentadiene; 1,3-hexadiene; 2,4-hexadiene; dichlorobutadiene; bromobutadiene and dibromobutadiene as well as mixtures of conjugated diene monomers. In a preferred embodiment, the conjugated diene monomer is 1,3-butadiene. Suitable non-conjugated diene monomers include, e.g., ethylidene norbornene, dicyclopentadiene, hexadiene or phenyl norbornene.

As used herein, the term "$C_{1-12}$ alkyl" means a straight chain or branched alkyl substituent group having from 1 to 12 carbon atoms per group, and includes, e.g., methyl, ethyl, n-butyl, sec-butyl, t-butyl, n-propyl, iso-propyl, pentyl, hexyl, heptyl, octyl, nonyl, decyl, undecyl and dodecyl. As used herein, the terminology "(meth)acrylate monomers" refers collectively to acrylate monomers and methacrylate monomers. Suitable $C_{1-12}$ alkyl (meth)acrylate monomers include $C_{1-12}$ alkyl acrylate monomers, e.g., ethyl acrylate, butyl acrylate, iso-pentyl acrylate, n-hexyl acrylate, 2-ethyl hexyl acrylate, and their $C_{1-12}$ alkyl methacrylate analogs such as, e.g., methyl methacrylate, ethyl methacrylate, propyl methacrylate, iso-propyl methacrylate, butyl methacrylate, hexyl methacrylate, decyl methacrylate.

The elastomeric phase may, optionally, include up to about 25 percent by weight ("wt %") of one or more monomers selected from $C_{2-8}$ olefin monomers, vinyl aromatic monomers and monoethylenically unsaturated nitrile monomers.

As used herein, the term "$C_{2-8}$ olefin monomers" means a compound having from 2 to 8 carbon atoms per molecule and having a single site of ethylenic unsaturation per molecule. Suitable $C_{2-8}$ olefin monomers include, e.g., ethylene, propene, 1-butene, 1-pentene, heptene.

Suitable vinyl aromatic monomers include, e.g., styrene and substituted styrenes having one or more alkyl, alkoxyl, hydroxyl or halo substituent groups attached to the aromatic ring, including, e.g., α-methyl styrene, p-methyl styrene, vinyl toluene, vinyl xylene, trimethyl styrene, butyl styrene, chlorostyrene, dichlorostyrene, bromostyrene, p-hydroxystyrene, methoxystyrene and vinyl-substituted condensed aromatic ring structures, such as, e.g., vinyl naphthalene, vinyl anthracene, as well as mixtures of vinyl aromatic monomers.

As used herein, the term "monoethylenically unsaturated nitrile monomer" means an acyclic compound that includes a single nitrile group and a single site of ethylenic unsaturation per molecule and includes, e.g., acrylonitrile, methacrylonitrile, α-chloro acrylonitrile.

The elastomeric phase may, optionally, include a minor amount, e.g., up to 5 wt %, of repeating units derived from a polyethylenically unsaturated "crosslinking" monomer, e.g., butylene diacrylate, divinyl benzene, butene diol dimethacrylate, trimethylolpropane tri(meth)acrylate. As used herein, the term "polyethylenically unsaturated" means having two or more sites of ethylenic unsaturation per molecule.

The elastomeric phase may, particularly in those embodiments wherein the elastomeric phase has repeating units derived from alkyl (meth)acrylate monomers, include a minor amount, e.g., up to 5 wt % of repeating units derived from a polyethylenically unsaturated "graftlining" monomer. Suitable graftlinking monomers include those monomers having a first site of ethylenic unsaturation with a reactivity similar to that of the ethylenically unsaturated monomers from which the respective substrate or superstrate is derived and a second site of ethylenic unsaturation with a relative reactivity that is substantially different from that of the ethylenically unsaturated monomers from which the elastomeric substrate phase is derived so that the first site reacts during synthesis of the elastomeric phase and the second site is available for later reaction under different reaction conditions, e.g., during synthesis of the rigid thermoplastic superstrate phase. Suitable graftlinking monomers include, e.g., allyl methacrylate, diallyl maleate, triallyl cyanurate.

In a preferred embodiment, the elastomeric phase comprises from about 60 to 100 wt % repeating units derived from one or more conjugated diene monomers and from 0 to about 40 wt % repeating units derived from one or more monomers selected from vinyl aromatic monomers and monoethylenically unsaturated nitrile monomers, such as, for example, a styrene-butadiene copolymer, an acrylonitrile-butadiene copolymer or a styrene-butadiene-acrylonitrile copolymer.

In an alterative preferred embodiment, the elastomeric phase comprises repeating units derived from one or more $C_{1-12}$ alkyl (meth)acrylate monomers. In a more highly preferred embodiment, the elastomeric phase comprises from 40 to 95 wt % repeating units derived from one or more $C_{1-12}$ alkyl (meth)acrylate monomers, more preferably from one or more monomers selected from ethyl acrylate, butyl acrylate and n-hexyl acrylate.

In a preferred embodiment, the elastomeric phase is made by aqueous emulsion polymerization in the presence of a free radical initiator, e.g., an azonitrile initiator, an organic peroxide initiator, a persulfate initiator or a redox initiator system, and, optionally, in the presence of a chain transfer agent, e.g., an alkyl mercaptan, and coagulated to form particles of elastomeric phase material. In a preferred embodiment, the emulsion polymerized particles of elastomeric phase material have a weight average particle size of about 50 to about 800 nm, more preferably, of from about 100 to about 500 nm, as measured by light transmission. The size of emulsion polymerized elastomeric particles may optionally be increased by mechanical or chemical agglomeration of the emulsion polymerized particles, according to known techniques.

The rigid thermoplastic resin superstrate phase comprises one or more thermoplastic polymers and exhibits a Tg of greater than 25° C., preferably greater than or equal to 90° C. and even more preferably greater than or equal to 100° C.

In a preferred embodiment, the rigid thermoplastic phase comprises a polymer or a mixture of two or more polymers each having repeating units derived from one or more monomers selected from the group consisting of $C_{1-12}$ alkyl (meth)acrylate monomers, vinyl aromatic monomers and monoethylenically unsaturated nitrile monomers. Suitable $C_{1-12}$ alkyl (meth)acrylate monomers, vinyl aromatic monomers and monoethylenically unsaturated nitrile monomers are those set forth above in the description of the elastomeric phase.

In a highly preferred embodiment, the rigid thermoplastic phase comprises one or more vinyl aromatic polymers. Suitable vinyl aromatic polymers comprise at least 50 wt % repeating units derived from one or more vinyl aromatic monomers. In a preferred embodiment, the rigid thermoplastic phase comprises a vinyl aromatic polymer having first repeating units derived from one or more vinyl aromatic monomers and having second repeating units derived from one or more monoethylenically unsaturated nitrile monomers. In a more preferred embodiment, the rigid thermoplastic phase comprises from about 60% to about 90% by weight repeating units derived from styrene and from about 10% to about 40% by weight repeating units derived from acrylonitrile. In an alternative preferred embodiment, the rigid thermoplastic phase comprises repeating units derived from one or more $C_{1-12}$ alkyl (meth)acrylate monomers, and may, optionally, further comprise repeating units derived from one or more monomers selected from vinyl aromatic monomers and ethylenically unsaturated nitrile monomers. In another preferred embodiment, the rigid thermoplastic phase comprises greater than or equal to 50% by weight repeating units derived from one or more $C_{1-12}$ alkyl (meth)acrylate monomers, more preferably from one or more monomers selected from methyl methacrylate, ethyl methacrylate, propyl methacrylate, isopropyl methacrylate and butyl methacrylate.

The rigid thermoplastic phase is made according to known processes, e.g., mass polymerization, emulsion polymerization, suspension polymerization or combinations thereof, wherein at least a portion of the rigid thermoplastic phase is chemically bonded, i.e., "grafted" to the elastomeric phase via reaction with unsaturated sites present in the elastomeric phase. The unsaturated sites in the elastomeric phase are provided, e.g., by residual unsaturated sites in repeating units derived from a conjugated diene or by residual unsaturated sites in repeating units derived from a graftlinking monomer.

In a preferred embodiment, at least a portion of the rigid thermoplastic phase is made by an aqueous emulsion or aqueous suspension polymerization reaction in the presence of elastomeric phase and a polymerization initiator system, e.g., a thermal or redox initiator system. In an alternative preferred embodiment, at least a portion of the thermoplastic phase is made by a mass polymerization process, wherein particles of the material from which the elastomeric phase is to be formed are dispersed in a mixture of the monomers from which the rigid thermoplastic phase is to be formed, and the monomers of the mixture are then polymerized to form the rubber-modified thermoplastic resin.

The amount of grafting that takes place between the rigid thermoplastic phase and the elastomeric phase varies with the relative amount and composition of the elastomeric phase. In a preferred embodiment, from about 10 to about 90 wt %, preferably from about 30 to about 80 wt %, even more preferably from about 65 to about 80 wt % of the rigid thermoplastic phase is chemically grafted to the elastomeric phase and from about 10 to about 90 wt %, preferably from about 20 to about 70 wt %, more preferably from about 20 to about 35 wt % of the rigid thermoplastic phase remains free, i.e., non-grafted.

The rigid thermoplastic phase of the rubber modified thermoplastic resin may be formed: (i) solely by polymerization carried out in the presence of the elastomeric phase or (ii) by addition of one or more separately polymerized rigid thermoplastic polymers to a rigid thermoplastic polymer that has been polymerized in the presence of the elastomeric phase. In a preferred embodiment, less than about 10 parts by weight (pbw), more preferably less than about 5 pbw of separately polymerized rigid thermoplastic polymer is added per 100 pbw of the thermoplastic resin composition of the present invention. Most preferably no separately polymerized rigid thermoplastic polymer is added to the thermoplastic resin composition of the present invention.

Each of the polymers of the elastomeric phase and of the rigid thermoplastic resin phase of the rubber modified thermoplastic resin may, provided that the Tg limitation for the respective phase is satisfied, optionally include up to 10 wt % of repeating units derived from one or more other copolymerizable monomers such as, e.g., monoethylenically unsaturated carboxylic acids such as, e.g., acrylic acid, methacrylic acid, itaconic acid; hydroxy $C_{1-12}$ alkyl (meth)acrylate monomers such as, e.g., hydroxyethyl methacrylate; $C_{4-12}$ cycloalkyl (meth)acrylate monomers such as e.g., cyclohexyl methacrylate; (meth)acrylamide monomers such as e.g., acrylamide and methacrylamide; maleimide monomers such as, e.g., N-alkyl maleimides, N-aryl maleimides; maleic anhydride; vinyl esters such as, e.g., vinyl acetate and vinyl propionate. As used herein, the term "$C_{4-12}$ cycloalkyl" means a cyclic alkyl substituent group having from 3 to 12 carbon atoms per group, and the term "(meth)acrylamide" refers collectively to acrylamides and methacrylamides.

In a first preferred embodiment, the elastomeric substrate comprises repeating units derived from one or more conjugated diene monomers, and may, optionally, further comprise repeating units derived from one or more monomers selected from vinyl aromatic monomers and monoethylenically unsaturated nitrile monomers, and the thermoplastic superstrate comprises repeating units derived from one or more monomers selected from butadiene, vinyl aromatic monomers and monoethylenically unsaturated nitrile monomers. The preferred graft copolymer resins include, for example, acrylonitrile-butadiene-styrene resins commonly referred to as "ABS" resins.

Especially preferred are acrylonitrile-butadiene-styrene copolymers having greater than 30% by weight elastomeric substrate, preferably greater than about 45% by weight elastomeric substrate. The most preferred elastomeric substrates comprise polybutadiene or styrene-butadiene copolymer. Suitable acrylonitrile-butadiene-styrene copolymers may be produced by any method known in the art. In a preferred embodiment a suitable ABS is a high rubber graft acrylonitrile-butadiene-styrene copolymer produced in a process which includes an emulsion polymerization step. The phrase "high rubber graft" refers generally to graft copolymer resins wherein at least about 30% by weight, preferably at least about 45% by weight of the rigid polymeric phase is chemically bound or grafted to the elastomeric substrate phase. Suitable ABS-type high rubber graft copolymers are commercially available from, for example, GE Plastics, Inc. under the trademark BLENDEX and include grades 131, 336, 338, 360, and 415. In another preferred embodiment a suitable ABS is one produced in a process which includes a mass polymerization step, so-called bulk ABS. Bulk ABS may typically have inclusions of copolymerized styrene-acrylonitrile within the rubber particle dispersed phase.

In another preferred embodiment, the elastomeric substrate comprises repeating units derived from one or more- $C_{1-12}$ alkyl (meth)acrylates and the rigid thermoplastic superstrate comprises repeating units derived from one or more monomers selected from vinyl aromatic monomers and monoethylenically unsaturated nitrile monomers. Such addition polymers include, for example, styrene-acrylate ("SA") high rubber graft copolymers and acrylonitrile-styrene-acrylate ("ASA") high rubber graft copolymers. Suitable ASA-type graft copolymers are commercially available from, for example, GE Plastics, Inc. under the trademark BLENDEX and include grade 975, 977, and 980.

In a yet another preferred embodiment, the elastomeric substrate comprises repeating units derived from one or more conjugated diene monomers and may, optionally, further comprise repeating units derived from one or more monomers selected from $C_{1-12}$ alkyl (meth)acrylate monomers, vinyl aromatic monomers and monoethylenically unsaturated nitrile monomers, and the thermoplastic superstrate comprises repeating units derived from one or more $C_{1-12}$ alkyl (meth)acrylate monomers and may, optionally, further comprise repeating units derived from one or more monomers selected from vinyl aromatic monomers and monoethylenically unsaturated nitrile monomers, such as, for example, methyl methacrylate-acrylonitrile-butadiene-styrene ("MABS") high rubber graft copolymers, methacrylate-butadiene-styrene ("MBS") high rubber graft copolymers. Suitable MBS-type graft copolymers are commercially available from Rohm and Haas Company under the trademark PARALOID and include grades BTA-733 and BTA-753, and from Kaneka Tex. under the trademark KANE ACE and include grade B-56.

In another preferred embodiment, the elastomeric substrate comprises repeating units derived from one or more olefin monomers and may, optionally, further comprise repeating units derived from one or more non-conjugated diene monomers, and the thermoplastic superstrate comprises repeating units derived from one or more monomers selected from vinyl aromatic monomers and monoethylenically unsaturated nitrile monomers. Such addition polymers include, for example, acrylonitrile-ethylene-propylene-styrene ("AES") high rubber graft copolymers.

In still another preferred embodiment, the elastomeric substrate comprises repeating units derived from one or more $C_{1-12}$ alkyl (meth)acrylate monomers, and the thermoplastic superstrate comprises repeating units derived from one or more $C_{1-12}$ alkyl (meth)acrylate monomer, and include, for example, acrylic core-shell graft copolymers. Also included with the acrylic core-shell graft copolymers are butadiene-modified acrylic copolymers. Suitable acrylic-type graft copolymers are commercially available from Rohm and Haas Company under the trademark PARALOID and include grades KM 334 and KM 355, and from Elf Atochem as grade Dura-strength 200.

The phosphoryl compound comprises at least one compound of formula V:

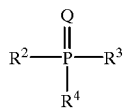

(V)

wherein Q is oxygen or sulfur; and $R^2$, $R^3$, and $R^4$ are each independently an alkyloxy, alkylthio, aryloxy, or arylthio residue, or an aryloxy or arylthio residue containing at least one alkyl or halogen substitution, or mixture thereof; or an amine residue. Suitable compounds include, but are not limited to, phosphates such as resorcinol bis(diphenyl phosphate), bisphenol A bis (diphenyl phosphate), resorcinol bis (di-2,6-xylyl phosphate), hydroquinone bis(di-2,6-xylyl phosphate), and phosphoramides. As used herein, the term "phosphoramide" refers to a phosphorus-containing compound of formula V in which at least one of $R^2$, $R^3$, and $R^4$ is an amine residue.

Particularly preferred in compositions of the present invention is at least one phosphoramide having a glass transition point of at least about 0° C., preferably of at least about 10° C., and most preferably of at least about 20° C., of formula V, wherein $R^2$ is an amine residue, and $R^3$ and $R^4$ are independently an alkyloxy, alkylthio, aryloxy, or arylthio residue, or an aryloxy or arylthio residue containing at least one alkyl or halogen substitution, or mixture thereof; or an amine residue. Examples of such phosphoramides are disclosed in U.S. Pat. No. 5,973,041.

When a phosphoramide having a glass transition point of at least about 0° C. is used as a source of phosphorus in resin compositions, test specimens made from the compositions unexpectedly had a higher heat deflection temperature compared to test specimens made from compositions containing a triaryl organophosphate. Although the invention is not dependent upon mechanism, it is believed that selection of each of $R^2$, $R^3$, and $R^4$ residues that result in restricted rotation of the bonds connected to the phosphorus provide an increased glass transition point in comparison to similar phosphoramides with residues having a lesser degree of restriction. Residues having bulky substituents such as, for example, aryloxy residues containing at least one halogen, or preferably at least one alkyl substitution, result in phosphoramides having a higher glass transition point than similar phosphoramides without the substitution on the aryloxy residue. Likewise, residues wherein at least two of the $R^2$, $R^3$, and $R^4$ residues are interconnected, such as a neopentyl residue for the combination of the $R^3$ and $R^4$ residues, can lead to desired phosphoramides having a glass transition point of at least about 0° C.

In a preferred embodiment, the phosphoramide comprises a phosphoramide having a glass transition temperature of at least about 0° C., preferably of at least about 10° C., and most preferably of at least about 20° C., of the formula XII:

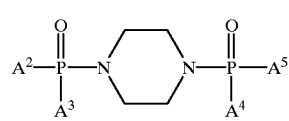

(XII)

wherein each Q is independently oxygen or sulfur, and each of $A^{2-5}$ is independently an alkyloxy, alkylthio, aryloxy, or arylthio residue, or an aryloxy or arylthio residue containing at least one alkyl or halogen substitution, or mixture thereof; or an amine residue. In an especially preferred embodiment of the invention, each Q is oxygen; and each of $A^{2-5}$ in formula XII is a 2,6-dimethylphenoxy moiety, or each of $A^{2-5}$ is a 2,4,6-trimethylphenoxy moiety. These phosphoramides are piperazine phosphoramides. In the above formula wherein each Q is oxygen, and each A is a 2,6-dimethylphenoxy moiety, the glass transition temperature of the corresponding phosphoramide is about 62° C. and the melting point is about 192° C. Conversely, in the above formula wherein each Q is oxygen, and each A is phenoxy, the glass transition temperature of the corresponding phosphoramide is about 0° C. and the melting point is about 188° C. It was unexpected that the glass transition temperature would be so high (i.e. about 62° C.) for the phosphoramide of formula XII wherein each Q is oxygen, and each A is a 2,6-dimethylphenoxy moiety as compared to the corresponding phosphoramide of formula XII wherein each Q is oxygen, and each A is a phenoxy moiety (i.e. about 0° C.), especially since the melting points for the two phosphoramides differ by only about 4° C. For comparison, the glass transition temperature of tetraphenyl resorcinol diphosphate is about −38° C. It is also possible to make phosphoramides with intermediate glass transition temperatures by using a mixture of various substituted and non-substituted aryl moieties within the phosphoramide.

In another preferred embodiment, the phosphoramide comprises a phosphoramide having a glass transition temperature of at least about 0° C., preferably of at least about 10° C., and most preferably of at least about 20° C., of the formula XIII:

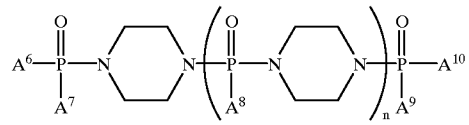

(XIII)

wherein each Q is independently oxygen or sulfur; and each $A^{6-10}$ is independently an alkyloxy, alkylthio, aryloxy, or arylthio residue, or an aryloxy or arylthio residue containing at least one alkyl or halogen substitution, or mixture thereof; or an amine residue;

and n is from 0 to about 5. In a more preferred embodiment, each Q is oxygen, and each $A^{6-10}$ moiety is independently phenoxy, 2,6-dimethylphenoxy, or 2,4,6-trimethylphenoxy, and n is from 0 to about 5.

In another embodiment of the invention the phosphoramide comprises a phosphoramide having a glass transition temperature of at least about 0° C., preferably of at least about 1 0° C., and most preferably of at least about 20° C., of the formula XIV:

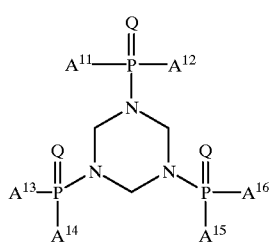

(XIV)

wherein each Q is independently oxygen or sulfur; and each of $A^{11-16}$ is independently an alkyloxy, alkylthio, aryloxy, or arylthio residue, or an aryloxy or arylthio residue containing at least one alkyl or halogen substitution, or mixture thereof; or an amine residue. In a more preferred embodiment, each Q is oxygen, and each $A^{11-16}$ moiety is independently phenoxy, 2,6-dimethylphenoxy, or 2,4,6-trimethyl-phenoxy.

In another embodiment of the invention the phosphoramide comprises a phosphoramide having a glass transition temperature of at least about 0° C., preferably of at least about 10° C., and most preferably of at least about 20° C., of the formula XV:

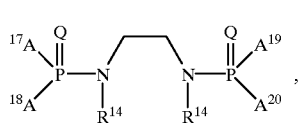

(XV)

wherein each Q is independently oxygen or sulfur; each of $A^{17-20}$ is independently an alkyloxy, alkylthio, aryloxy, or arylthio residue, or an aryloxy or arylthio residue containing at least one alkyl or halogen substitution, or mixture thereof; or an amine residue; and each $R^{14}$ is an alkyl radical, or both $R^{14}$ radicals taken together are an alkylidene or alkyl-substituted alkylidene radical. In a preferred embodiment, each Q is oxygen; both $R^{14}$ radicals taken together are an unsubstituted $(CH_2)_m$ alkylidene radical, wherein m is 2–10; and each $A^{17-20}$ moiety is independently phenoxy, 2,6-dimethylphenoxy, or 2,4,6-trimethylphenoxy. In a more preferred embodiment, each Q is oxygen; each $R^{14}$ is methyl; and each $A^{17-20}$ moiety is independently phenoxy, 2,6-dimethylphenoxy, or 2,4,6-trimethylphenoxy.

In another embodiment of the invention, the phosphoramide comprises a phosphoramide having a glass transition point of at least about 0° C., preferably of at least about 10° C., and most preferably of at least about 20° C., of the formula V:

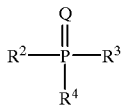

(V)

wherein Q is oxygen or sulfur, and $R^2$ is of the formula XVI:

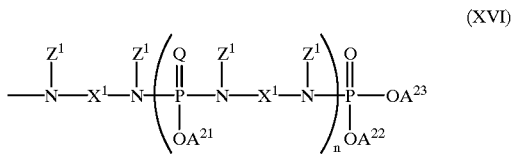

(XVI)

wherein each Q is independently oxygen or sulfur; each of $A^{21-23}$ is independently an alkyloxy, alkylthio, aryloxy, or arylthio residue, or an aryloxy or arylthio residue containing at least one alkyl or halogen substitution, or mixture thereof; or an amine residue; each $Z^1$ is an alkyl radical, aromatic radical, or aromatic radical containing at least one alkyl or halogen substitution or mixture thereof; each $X^1$ is an alkylidene radical, aromatic radical, or aromatic radical containing at least one alkyl or halogen substitution or mixture thereof; n is from 0 to about 5; and $R^3$ and $R^4$ are each independently an alkyloxy, alkylthio, aryloxy, or arylthio residue, or an aryloxy or arylthio residue containing at least one alkyl or halogen substitution, or mixture thereof; or an amine residue. In a preferred embodiment, each Q is oxygen; each $A^{21-23}$ moiety is independently phenoxy, 2,6-dimethylphenoxy, or 2,4,6-trimethylphenoxy; each $Z^1$ is methyl or benzyl; each $X^1$ is an alkylidene radical containing 2–24 carbon atoms; n is from 0 to about 5; and $R^3$ and $R^4$ are each independently phenoxy, 2,6-dimethylphenoxy, or 2,4,6-trimethylphenoxy.

In another embodiment of the invention, the phosphoramide comprises a phosphoramide having a glass transition point of at least about 0° C., preferably of at least about 10° C., and most preferably of at least about 20° C., of the formula V:

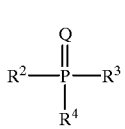

(V)

wherein Q is oxygen or sulfur; and $R^2$ is of the formula XVII:

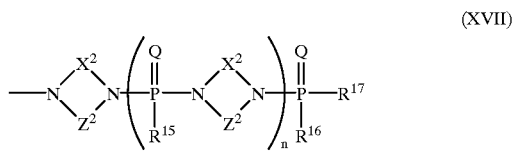

(XVII)

wherein each Q is independently oxygen or sulfur; each $X^2$ is an alkylidene or alkyl-substituted alkylidene residue, aryl residue, or alkaryl residue; each $Z^2$ is an alkylidene or alkyl-substituted alkylidene residue; each of $R^{15}$, $R^{16}$, and $R^{17}$ is independently an alkyloxy, alkylthio, aryloxy, or arylthio residue, or an aryloxy or arylthio residue containing at least one alkyl or halogen substitution, or mixture thereof; or an amine residue; n is from 0 to about 5; and $R^3$ and $R^4$ are each independently an alkyloxy, alkylthio, aryloxy, or arylthio residue, or an aryloxy or arylthio residue containing at least one alkyl or halogen substitution, or mixture thereof; or an amine residue. In a preferred embodiment, each Q is oxygen; each $X^2$ is an alkylidene or alkyl-substituted alkylidene residue; each $Z^2$ is an alkylidene or alkyl-substituted alkylidene residue; each of $R^3$, $R^4$, $R^{15}$, $R^{16}$, and $R^{17}$ is independently phenoxy, 2,6-dimethylphenoxy, or 2,4,6-trimethylphenoxy; and n is from 0 to about 5. In a more preferred embodiment, each Q is oxygen; each $X^2$ and $Z^2$ is independently an unsubstituted alkylidene residue of the form $(CH_2)_m$, wherein m is 2–10; each of $R^3$, $R^4$, $R^{15}$, $R^{16}$, and $R^{17}$ is independently phenoxy, 2,6-dimethylphenoxy, or 2,4,6-trimethyl-phenoxy; and n is from 0 to about 5. In an especially preferred embodiment, the phosphoramide is derived from piperazine (i.e. $X^2$ and $Z^2$ are each —$CH_2$—$CH_2$—).

In another preferred embodiment, the phosphoramide comprises a cyclic phosphoramide having a glass transition point of at least about 0° C., preferably of at least about 10° C., and most preferably of at least about 20° C. of the formula XVIII:

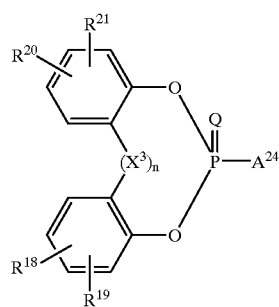

(XVIII)

wherein each of $R^{18-21}$ is independently a hydrogen or an alkyl radical, $X^3$ is an alkylidene radical, Q is oxygen or sulfur, and $A^{24}$ is a group derived from a primary or secondary amine having the same or different radicals that can be aliphatic, alicyclic, aromatic, or alkaryl, or $A^{24}$ is a group derived from a heterocyclic amine, or $A^{24}$ is a hydrazine compound. Preferably Q is oxygen. It should be noted that when n is 0, then the two aryl rings are linked together at that site (i.e. where $X^3$ is absent) by a single bond in the positions ortho,ortho' to the phosphoryl bonds.

In another preferred embodiment, the phosphoramide comprises a bis(cyclic) phosphoramide having a glass transition point of at least about 0° C., preferably of at least about 10° C., and most preferably of at least about 20° C. of the formula XIX:

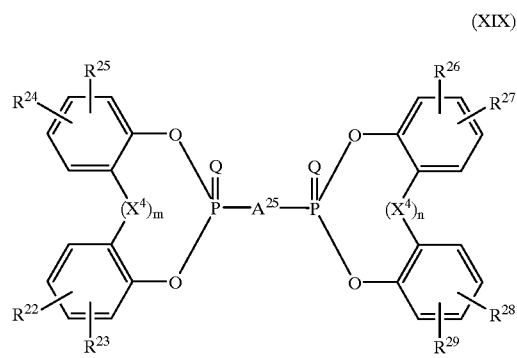

(XIX)

wherein Q is oxygen or sulfur; each of $R^{22-29}$ is independently a hydrogen or an alkyl radical; $X^4$ is an alkylidene radical; m and n are each independently 0 or 1; and $A^{25}$ is:

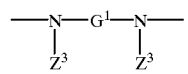

wherein $G^1$ is sulfur, an alkylidene radical, alkyl-substituted alkylidene radical, aryl radical, or alkaryl radical, and each $Z^3$ is independently an alkyl radical, an aryl radical, or an aryl radical containing at least one alkyl or halogen substitution, or mixture thereof; or wherein $A^{25}$ is

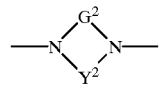

wherein $G^2$ is alkylidene, aryl, or alkaryl, and $Y^2$ is alkylidene or alkyl-substituted alkylidene. Preferred phosphoramides are those wherein Q is oxygen, $A^{25}$ is a residue of piperazine, and the phosphoramide has a plane of symmetry through $A^{25}$. Highly preferred phosphoramides include those wherein Q is oxygen; $A^{25}$ is a residue of piperazine; the phosphoramide has a plane of symmetry through $A^{25}$; at least one R substituent on each aryl ring is a methyl adjacent to the oxygen substituent; n and m are each 1; and $X^4$ is $CHR^{30}$ wherein $R^{30}$ is a hydrogen or an alkyl residue of from about 1 to about 6 carbon atoms. It should be noted that when either or both of m or n is 0, then the two aryl rings are linked together at that site (i.e. where $X^4$ is absent) by a single bond in the positions ortho,ortho' to the phosphoryl bonds.

It should be noted that in the descriptions herein, the words "radical" and "residue" are used interchangeably, and are both intended to designate an organic moiety. For example, alkyl radical and alkyl residue are both intended to designate an alkyl moiety. The term "alkyl" as used in the various embodiments of the present invention is intended to designate both normal alkyl, branched alkyl, aralkyl, and cycloalkyl radicals. Normal and branched alkyl radicals are preferably those containing from 1 to about 12 carbon atoms, and include as illustrative non-limiting examples methyl, ethyl, propyl, isopropyl, butyl, tertiary-butyl, pentyl, neopentyl, and hexyl. Cycloalkyl radicals represented are preferably those containing from 3 to about 12 ring carbon atoms. Some illustrative non-limiting examples of cycloalkyl radicals include cyclobutyl, cyclopentyl, cyclohexyl, methylcyclohexyl, cycloheptyl. Preferred aralkyl radicals are those containing from 7 to about 14 carbon atoms; these include, but are not limited to, benzyl, phenylbutyl, phenylpropyl, and phenylethyl. Aryl radicals used in the various embodiments of the present invention are preferably those containing from 6 to 12 ring carbon atoms. Some illustrative non-limiting examples of aryl radicals include phenyl, biphenyl, naphthyl. The preferred halogen radicals used in the various embodiments of the present invention are chlorine and bromine.

Phosphoramides of useful molecular structure are preferably prepared by the reaction of a corresponding amine such as, for example, piperazine or N,N'-dimethylethylenediamine with a diaryl chlorophosphate of the formula (aryl-O)$_2$POCl in the presence of a tertiary amine. This method of preparation is described in Talley, *J. Chem. Eng. Data,* 33,221–222 (1988) and leads to specific phosphoramide compounds without repeating units. Alternatively, phosphoramides may be prepared by the reaction of the corresponding amine with P(O)Cl$_3$ in the presence of a tertiary amine, with the desired hydroxyl- or thiohydroxy-containing compound added simultaneously or subsequently to the addition of the amine. Addition of a diamine or triamine to P(O)Cl$_3$ with simultaneous or subsequent addition of the hydroxyl or thiohydroxy-containing compound is believed to lead to repeating units of phosphoramide, often of 1 to about 5 phosphoramide linkages per compound. Similarly, addition of a diamine or triamine to a monosubstituted phosphoryl- or thiophosphoryl dichloride with simultaneous or subsequent addition of hydroxyl- or thiohydroxy-containing compound is also believed to lead to repeating units of phosphoramide. P(S)Cl$_3$ may be substituted for P(O)Cl$_3$ in the above preparations to provide suitable phosphoramides.

The resinous compositions of this invention may contain a flame retarding amount (defined below) and/or processability enhancing amount of at least one phosphoryl compound, for example, a phosphate ester, a phosphoramide, or a mixture of two or more phosphate esters, or two or more phosphoramides, or a phosphoramide and at least one non-polymeric or polymeric phosphorus additive selected from the group consisting of organic phosphate esters and thiophosphate esters. Preferred phosphorus additives are non-polymeric organic phosphate esters including, for example, alkyl phosphate esters, mixed alkyl-aryl phosphate esters, and aryl phosphate esters, including, but not limited to, resorcinol-based phosphate esters, and bisphenol-based phosphate esters known in the art. The resinous compositions preferably contain essentially a single phosphoryl compound, and most preferably a single phosphoramide.

Flame retardancy is preferably measured according to the Underwriters' Laboratory UL-94 protocol (ASTM procedure D3801). In this test, the desirable V-0 rating is given to polymers of which specimens do not burn with flaming combustion for more than 10 seconds after application of a test flame, and specimens do not burn with flaming combustion for a time exceeding 50 seconds upon 2 flame applications to each of 5 specimens; i.e., the total "flame-out time" (FOT) for said samples is not greater than 50 seconds. A flame retarding amount is an amount effective to render the composition at least a V-2 rating, preferably at least a V-1 rating, and most preferably a V-0 rating after testing in the UL-94 protocol when measured on a test specimen of about 0.03 to about 0.125 inch in thickness by about 0.5 inch by about 5 inch, preferably about 0.125 inch in thickness by about 0.5 inch by about 5 inch, more preferably about 0.06 inch in thickness by about 0.5 inch by about 5 inch, and most preferably about 0.03 inch in thickness by about 0.5 inch by about 5 inch dimensions. Enhanced processability can be determined, for example, as a reduction in extruder torque during compounding, reduced pressure in injection molding, reduced viscosity, and/or decreased cycle time.

For the most part, the compositions of the invention comprise about 55–95% by weight polyestercarbonate portion and about 5–45% addition polymer, based on total resinous constituents. It should be understood that the proportion of polyestercarbonate also includes any additional homopolycarbonate, polyarylate or mixture thereof, when present. The phosphoryl compound is present typically in the range of about 0.1–5 parts of phosphorus per 100 parts of resinous materials (phr), all percentages herein being by weight. More preferably, the phosphoryl compound is present in a flame retarding amount, typically in the range of about 0.25–2.5 parts by weight of phosphorus per 100 parts of resinous materials. The total amount of phosphoryl compound is most often in the range of about 1–50 phr, preferably about 5–35 phr.

In one embodiment of the present invention halogen-containing flame retardants or other halogen-containing species may also be present in the compositions. In many resinous compositions, the combination of a halogen-containing flame retardant and a phosphoryl compound, particularly a phosphoramide having a glass transition point of at least about 0° C., provides both suitable flame retardant properties and unexpectedly improved high temperature properties (such as measured, for example, by HDT or Tg of a resinous phase). Illustrative, non-limiting examples of halogen-containing flame retardants or halogen-containing species include brominated flame retardants and phosphoramides containing halogenated aromatic substituents. Due to environmental regulations chlorine-free and bromine-free compositions may be preferred for certain applications. Therefore, in a preferred embodiment the present invention includes compositions which are essentially free of chlorine and bromine. In this context essentially free means that no chlorine- or bromine-containing species has been added to the compositions in their formulation. In another of its embodiments the present invention includes articles obtained from said chlorine-free or bromine-free compositions.

The compositions of the invention may also contain other conventional additives including stabilizers, inhibitors, plasticizers, fillers, mold release agents and anti-drip agents. The latter are illustrated by tetrafluoroethylene polymers or copolymers, including mixtures with such other polymers as polstyrene-co-acrylonitrile.

The compositions of this invention are characterized by superior high temperature properties, as demonstrated by Tg values above those of comparable blends not containing ester structural units derived from formula II. They also often possess advantageously high heat deflection temperatures.

Preferred compositions of the invention contain a phosphoryl compound comprising a phosphoramide with Tg of at least about 0° C., preferably of at least about 10° C., and most preferably of at least about 20° C. Such compositions exhibit improved high temperature properties. This is demonstrated by the fact that the decrease in Tg exhibited as a result of the incorporation of such a phosphoramide in the composition is substantially less than the corresponding decrease exhibited in blends containing, for example, phosphate esters such as bis(diaryl phosphates) of dihydroxyaromatic compounds. This is evident when a phosphoramide is compared to the organic phosphate ester in amounts suitable to provide enhanced flame resistance when measured, for example, in the UL-94 test procedure. In the case of phase-separated blends such as polycarbonate-ABS blends, the decrease in Tg is noted in the polycarbonate phase.

Experience has shown that the flame retarding properties of a phosphoryl-based compound as an additive in a resinous composition are generally proportional to the amount of phosphorus in the composition rather than to the amount of the compound itself. Thus, equal weights of two additives having different molecular weights but the same flame retarding properties may produce different UL-94 results, but amounts of the two additives which contribute the same proportion of phosphorus to the resinous composition will produce the same UL-94 results. On the other hand, other physical properties such as high temperature resistance are dependent on the amount of the compound itself and relatively independent of the phosphorus proportion therein. For this reason, the dependence of flame retarding and high temperature resistance of compositions containing two phosphorus-based compounds may not follow the same pattern.

It has been shown, however, with respect to the preferred phosphoramides employed according to the present invention that their superior properties of flame retardance and high temperature resistance are consistent. Thus, for example, proportions of resorcinol bis(di-2,6-xylyl phosphate) effective to confer a suitable flame-out time on certain resinous compositions are similar to those produced by a typical bis(2,6-xylyl)-phosphoramide at an essentially equivalent level of phosphorus, but the bisphosphoramide has a substantially lower tendency to decrease heat deflection temperature (HDT) despite the slightly greater amount of the bulk additive.

It should be clear that the present invention also affords methods to increase the heat distortion temperature of flame resistant compositions containing an amount of at least one phosphoryl compound effective to render the composition a flame rating of at least V-2, preferably of at least V-1, most preferably V-0, in the UL-94 protocol, wherein the method comprises combining at least one polyestercarbonate comprising structural units of formulas I and II, at least one addition polymer, and at least one phosphoryl compound of the formula V. In a preferred embodiment the invention also affords methods to increase the heat distortion temperature of chlorine-free and bromine-free, flame resistant compositions as described in the previous sentence. The method may be used to increase the heat distortion temperature of compositions containing essentially a single phosphoryl compound or a mixture of two or more different types of phosphoryl compound. Compositions containing essentially a single phosphoryl compound are often preferred. The preferred phosphoryl compounds in most instances are resorcinol bis(diphenyl phosphate) (hereinafter "RDP"), bisphenol A bis(diphenyl phosphate) (hereinafter "BPADP") and N,N'-bis[di-(2,6-xylyl)phosphoryl]- piperazine, hereinafter "XPP", with XPP often being especially preferred because of its improved high temperature properties. It should also be clear that the present invention includes compositions made by the methods as well as articles made from the compositions.

Preparation methods for the compositions of the invention are typical of those employed for resinous blends. They may include such steps as dry blending followed by melt processing, the latter operation frequently being performed under continuous conditions as by extrusion. Following melt processing, the compositions are molded into test specimens by conventional means such as injection molding.

The addition of at least one phosphoryl compound or mixture of at least one phosphoryl compound and at least one phosphorus additive to the compositions of the present invention may be by mixing all of the blend components together prior to melt processing. Alternatively, any or a combination of any of the phosphorus-containing species, particularly a phosphoramide or a phosphorus additive, may be combined with at least one resinous blend component as a concentrate in a prior processing step. Such concentrates are often made by melt processing. The concentrate may then be combined with the remaining blend components.

The various embodiments of the invention are inclusive of simple blends comprising at least one polyestercarbonate comprising structural units of formulas I and II, at least one addition polymer, and at least one phosphoryl compound of the formula V, and also of compositions in which one or more of said materials has undergone chemical reaction, either by itself or in combination with another blend component. When proportions are specified, they apply to the originally incorporated materials rather than those remaining after any such reaction.

In another of its embodiments the present invention comprises articles of manufacture made from the instantly disclosed compositions. Said articles can be made by any convenient means known in the art. Typical means include, but are not limited to, injection molding, thermoforming, blow molding, and calendering. Especially preferred articles include indirect and direct wound deflection yokes for all cathode ray tube applications including television and computer monitors, slit type deflection yokes, mold coil deflection yokes, television backplates, docking stations, pedestals, bezels, pallets, electronic equipment such as switches, switch housings, plugs, plug housings, electrical connectors, connecting devices, sockets; housings for electronic equipment such as television cabinets, computer housings, including desk-top computers, portable computers, lap-top computers, palm-held computers; monitor housings, printer housings, keyboards, FAX machine housings, copier housings, telephone housings, mobile phone housings, radio sender and/or receiver housings, lights and lighting fixtures, battery chargers, battery housings, antenna housings, transformers, modems, cartridges, network interface devices, circuit breakers, meter housings, panels for wet and dry appliances such as dishwashers, clothes washers, clothes dryers, refrigerators; heating and ventilation enclosures, fans, air conditioner housings, cladding and seating for indoor and outdoor application such as public transportation including trains, subways, buses; automotive electrical components.

The invention is illustrated by the following examples. All parts and percentages are by weight. HDT values were determined at 264 psi (1820 kPa) according to ASTM procedure D648. Notched Izod impact strength values were determined according to ASTM procedure D256. Elongation (%) after exposure to solvent (ESCR) was determined on Type I tensile bars which had been mounted in a strain jig at 1% strain and exposed to 88:12 (vol/vol) hexane/ethyl acetate for 5 minutes at ambient temperature.

EXAMPLES 1–2

A blend of 70 wt. % bisphenol A homopolycarbonate, 9 wt. % of a commercially available high rubber graft ABS copolymer, 8.5 wt. % of a commercially available SAN copolymer, and a flame-retarding amount of RDP (11.5 phr corresponding to 1.24 phr phosphorus) was prepared by blending in a Henschel mixer followed by extrusion on a twin screw extruder, and was molded into test specimens. A control blend (Example 2) also containing homopolycarbonate-ABS-SAN but containing no flame retardant was prepared under identical conditions. The control blend had somewhat different proportions of polymers than the product of Example 1, but that is insignificant for comparison purposes since its only role was to serve as a baseline for the Tg of the polycarbonate phase. Each blend also contained conventional additives including 0.5 part of a polytetrafluoroethylene dispersion in styrene-acrylonitrile copolymer as an anti-drip agent, which were not considered in determining proportions. The notched Izod impact strength (NI) and % elongation after exposure to solvent (ESCR) were determined for the test specimens of Example 1. The Tg of the polycarbonate phase for test specimens of each example was determined. Comparison of Example 1 with the control Example 2 shows that a very significant loss in the polycarbonate Tg occurs with the addition of the required amount of RDP.

TABLE 1

| Component | 1 | 2 |
|---|---|---|
| Polycarbonate, wt. % | 70 | 73.6 |
| RDP, phr | 11.5 | 0 |
| Polycarbonate phase Tg (° C.) | 104 | 148 |
| ESCR (% elong) | 56 | |
| INI (ft-lbs/in) | 8 | |

EXAMPLES 3–12

Examples 3–12 were prepared in a similar manner to Example 1. These Examples each contained a polyestercarbonate (PCE) derived from bisphenol A-isophthalic/terephthalic acids and containing about 60 wt. % ester units and about 40 wt. % carbonate units. The polyestercarbonate was combined with various amounts of BPA homopolycarbonate (PC) to provide various weight ratios of ester/carbonate units. Blends of polyestercarbonate with or without homopolycarbonate were prepared containing 9 wt. % of a commercially available high rubber graft ABS copolymer, 8.5 wt. % of a commercially available SAN copolymer, and a flame-retarding amount of either RDP (11.5 phr corresponding to 1.24 phr phosphorus), or XPP (13.5 phr corresponding to 1.26 phr phosphorus). Each blend also contained conventional additives including 0.5 part of a polytetrafluoroethylene dispersion in styrene-acrylonitrile copolymer as an anti-drip agent, which were not considered in determining proportions. The notched Izod impact strength (NI) and tensile elongation after exposure to solvent (ESCR) were determined for the test specimens of Example 1. The Tg of the polycarbonate phase for test specimens of each example was determined. The results are shown in Table II. All ester/carbonate (es/ca) ratios are in wt. %.

TABLE 2

| % | 3 | 4 | 5 | 6 | 7 | 8 | 9 | 10 | 11 | 12 |
|---|---|---|---|---|---|---|---|---|---|---|
| | 60/40 es/ca | 30/70 es/ca | 20/80 es/ca | 10/90 es/ca | 60/40 es/ca | 50/50 es/ca | 40/60 es/ca | 30/70 es/ca | 20/80 es/ca | 10/90 es/ca |
| PCE | 70 | 35 | 23.31 | 11.69 | 67.84 | 56.53 | 45.23 | 33.92 | 22.61 | 11.31 |
| PC | 0 | 35 | 46.69 | 58.31 | 0 | 11.31 | 22.61 | 33.92 | 45.23 | 56.53 |
| RDP | 11.5 | 11.5 | 11.5 | 11.5 | 0 | 0 | 0 | 0 | 0 | 0 |
| XPP | 0 | 0 | 0 | 0 | 13.5 | 13.5 | 13.5 | 13.5 | 13.5 | 13.5 |
| Tg (° C.) | 127 | 115 | 117 | 115 | 150 | 147 | 143 | 139 | 139 | 137 |
| HDT (° C.) | 85 | 81 | 81 | 81 | 101 | 102 | 102 | 102 | 100 | 98 |
| ESCR (% elong) | 14 | 100 | 163 | 150 | 18 | 22 | 27 | 67 | 72 | 119 |
| NI (ft-lb/in) | 6 | 12.4 | 12.1 | 11.8 | 3.9 | 5.5 | 10.6 | 13.9 | 13.5 | 12.5 |

Comparison of Examples 3 to 6 (Table 2) with Example 1 (Table 1) shows that using different levels of polyester-carbonate copolymers (different ester/carbonate ratios) results in an increase in the polycarbonate phase Tg of 11 to 23° C. In addition, combinations of these PCE copolymers with the less plasticizing phosphoramide (XPP), (Examples 7 to 12, Table 2), lead to compositions with an increase in the polycarbonate phase Tg of 33 to 46° C.

The data also show that using PCE copolymers has a positive effect on the impact properties of the resulting blends. The notched Izod impact strength at room temperature increases significantly from 6 ft-lb/in to 12 ft-lb/in for the formulations containing RDP (Examples 3–6), and from 4 ft-lb/in to 14 ft-lb/in for the formulations containing XPP (Examples 7–12).

A similar effect is also observed for % tensile elongation after exposure to solvent (ESCR). Initially, Examples 3, 7, 8 and 9 in Table 2 show that the ESCR performance of PCE containing blends (60 to 40 wt % ester) does not meet the requirements for typical applications (cf. Example 1, Table 1). However, Examples 4, 5, and 6 and Examples 10, 11, and 12 show very clearly that at a certain weight ratio of ester/carbonate (30 wt. % ester and lower), flame retardant compositions can be achieved with an excellent combination of ESCR, ductility and high heat performance.

What is claimed is:

1. A resin composition comprising the following and any reaction products thereof:

a) at least one polyestercarbonate comprising structural units of the formula I:

(I)

wherein D is a divalent aromatic radical; and repeating or recurring structural units of the formula II:

(II)

wherein D has the meaning previously ascribed to it and R¹ is at least one divalent moiety selected from those of the formulae III and IV:

(III)

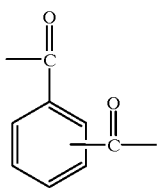

(IV)

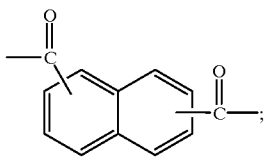

b) at least one addition polymer; and
c) at least one phosphoryl compound having a glass transition point of at least about 0° C. of the formula V:

(V)

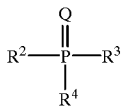

wherein Q is oxygen or sulfur; and $R^2$, $R^3$, and $R^4$ are each independently an alkyloxy, alkylthio, aryloxy, or arylthio residue, or an aryloxy or arylthio residue containing at least one alkyl or halogen substitution, or mixture thereof; or an amine residue.

2. The composition according to claim 1 wherein D comprises units derived from bisphenol A.

3. The composition according to claim 1 wherein D comprises units derived from 6,6'-dihydroxy-3,3,3',3'-tetramethyl-1,1'-spirobiindane.

4. The composition according to claim 1 wherein $R^1$ comprises units derived from at least one of isophthalic acid, terephthalic acid, and naphthalene-2,6-dicarboxylic acid.

5. The composition according to claim 1 wherein $R^1$ comprises units derived from a mixture of isophthalic acid and terephthalic acid.

6. The composition according to claim 5 wherein the weight ratio of isophthalic acid to terephthalic acid is in the range of about 95:5 to about 5:95.

7. The composition according to claim 6 wherein the weight ratio of isophthalic acid to terephthalic acid is in the range of about 93:7 to about 50:50.

8. The composition according to claim 1 wherein the weight ratio of formula I units to formula II units is in the range of about 10:90 to about 90:10.

9. The composition according to claim 8 wherein the weight ratio of formula I units to formula II units is in the range of about 20:80 to about 40:60.

10. The composition according to claim 1 wherein the addition polymer is a copolymer of an alkenylaromatic compound.

11. The composition according to claim 10 wherein the alkenylaromatic compound is styrene.

12. The composition according to claim 11 wherein the addition polymer is at least one styrene-acrylonitrile copolymer.

13. The composition according to claim 12 wherein the addition polymer is a combination of two styrene-acrylonitrile copolymers.

14. The composition according to claim 13 wherein one of the styrene-acrylonitrile copolymers is an ABS copolymer.

15. The composition according to claim 1 which comprises about 55–95% by weight polyestercarbonate portion and about 5–45% by weight addition polymer, based on total resinous constituents.

16. The composition according to claim 1 wherein the phosphoryl compound comprises at least one member selected from the group consisting of phosphate esters and phosphoramides.

17. The composition according to claim 16 wherein the phosphoryl compound is a phosphoramide of the formula XII:

(XII)

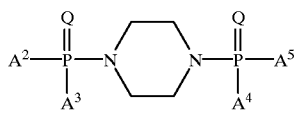

wherein each Q is independently oxygen or sulfur; and each of $A^{2-5}$ is a 2,6-dimethylphenoxy moiety or a 2,4,6-trimethylphenoxy moiety.

18. The composition of claim 17 wherein the phosphoryl compound is a phosphoramide of the formula XII:

(XII)

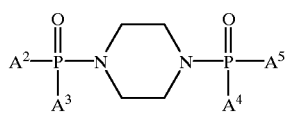

wherein each Q is oxygen; and each of $A^{2-5}$ is a 2,6-dimethylphenoxy moiety.

19. The composition of claim 1 wherein the phosphoryl compound comprises at least one phosphoramide having a glass transition point of at least about 0° C.

20. The composition of claim 19 wherein all of the phosphoramide has a glass transition point of at least about 0° C.

21. The composition of claim 1 wherein $R^2$ is of the formula XVI:

(XVI)

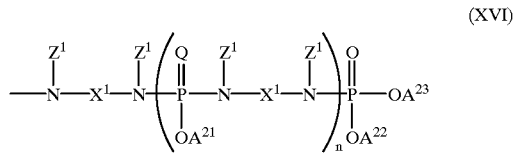

wherein
each Q is independently oxygen or sulfur;
each of $A^{21-23}$ is independently an alkyloxy, alkylthio, aryloxy, or arylthio residue, or an aryloxy or arylthio residue containing at least one alkyl substitution; or an amine residue;
each $Z^1$ is an alkyl radical, aromatic radical, or aromatic radical containing at least one alkyl substitution;
each $X^1$ is an alkylidene radical, aromatic radical, or aromatic radical containing at least one alkyl substitution;
n is from 0 to about 5; and
$R^3$ and $R^4$ are each independently an alkyloxy, alkylthio, aryloxy, or arylthio residue, or an aryloxy or arylthio residue containing at least one alkyl substitution; or an amine residue.

22. The composition of claim 1 wherein $R^2$ is of the formula XI:

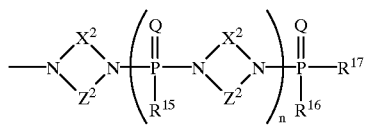
(XVII)

wherein each Q is independently oxygen or sulfur;

each $X^2$ is alkylidene, aryl, or alkaryl;

each $Z^2$ is alkylidene;

each of $R^{15}$, $R^{16}$, and $R^{17}$ is independently an alkyloxy residue, an aryloxy residue, an aryloxy residue containing at least one alkyl substitution, or an amine residue; and n is from 0 to about 5; and $R^3$ and $R^4$ are each independently an alkyloxy, alkylthio, aryloxy, or arylthio residue, or an aryloxy or arylthio residue containing at least one alkyl substitution; or an amine residue.

23. The composition of claim 1 wherein at least one phosphoryl compound is present in an amount effective to render the resin composition a flame rating of V-0, V-1, or V-2 in the Underwriter's Laboratory UL-94 protocol when measured on a test specimen of about 0.125 inch by about 0.5 inch by about 5 inch dimensions.

24. The composition of claim 1 wherein the total amount of phosphorus per 100 parts of resinous materials is in the range of about 0.1–3 parts by weight.

25. The composition of claim 1 which is essentially free of chlorine and bromine.

26. A resin composition comprising the following and any reaction products thereof:

a) at least one polyestercarbonate comprising structural units of the formula I:

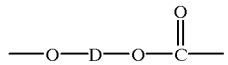
(I)

wherein D is a divalent aromatic radical; and repeating or recurring structural units of the formula II:

 (II)

wherein D has the meaning previously ascribed to it and $R^1$ is at least one divalent moiety selected from those of the formulae III and IV:

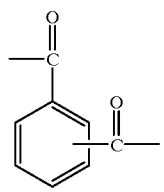
(III)

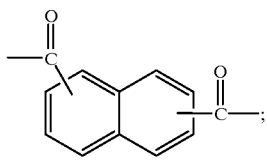
(IV)

b) at least one addition polymer; and c) at least one phosphoramide having a glass transition point of at least about 0° C. of the formula XIV:

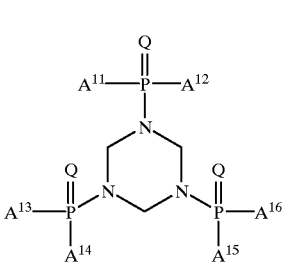
(XIV)

wherein each Q is independently oxygen or sulfur; and each of $A^{11-16}$ is independently an alkyloxy, alkylthio, aryloxy, or arylthio residue, or an aryloxy or arylthio residue containing at least one alkyl substitution; or an amine residue.

27. A resin composition comprising the following and any reaction products thereof:

a) at least one polyestercarbonate comprising structural units of the formula I:

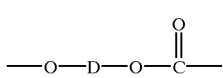
(I)

wherein D is a divalent aromatic radical; and repeating or recurring structural units of the formula II:

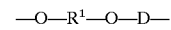 (II)

wherein D has the meaning previously ascribed to it and $R^1$ is at least one divalent moiety selected from those of the formulae III and IV:

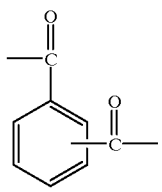
(III)

-continued

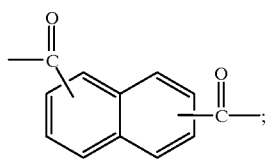
(IV)

b) at least one addition polymer; and c) at least one cyclic phosphoramide having a glass transition point of at least about 0° C. of the formula XVIII:

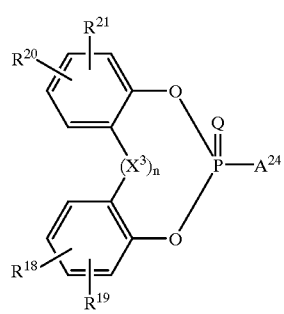
(XVIII)

wherein Q is oxygen or sulfur; each $R^{18-21}$ is independently a hydrogen or an alkyl radical; $X^3$ is a alkylidene radical; n is 0 or 1; and $A^{24}$ is a group derived from a primary or secondary amine that can be aliphatic, alicyclic, aromatic, or alkaryl, or $A^{24}$ is a group derived from a heterocyclic amine, or $A^{24}$ is a hydrazine compound.

28. A resin composition comprising the following and any reaction products thereof:

a) at least one polyestercarbonate comprising structural units of the formula I:

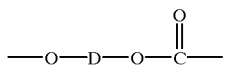
(I)

wherein D is a divalent aromatic radical; and repeating or recurring structural units of the formula II:

—O—R¹—O—D—  (II)

wherein D has the meaning previously ascribed to it and $R^1$ is at least one divalent moiety selected from those of the formulae III and IV:

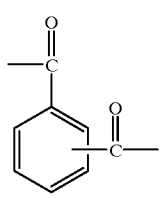
(III)

-continued

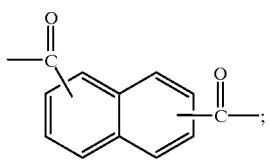
(IV)

b) at least one addition polymer; and c) at least one cyclic phosphoramide having a glass transition point of at least about 0° C. of the formula XIX:

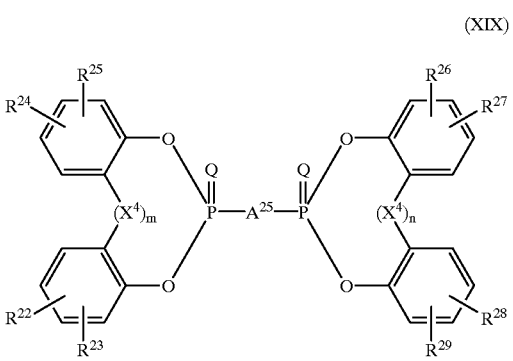
(XIX)

wherein each Q is independently oxygen or sulfur; each of $R^{22-29}$ is independently a hydrogen or an alkyl radical; and $A^{25}$ is

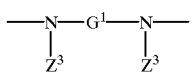

wherein $G^1$ is sulfur, an alkyl, aryl, or alkaryl radical, $X^4$ is an alkylidene radical, each of m and n is independently 0 or 1, and each $Z^3$ is independently an alkyl radical or an aryl radical, or wherein $A^{25}$ is

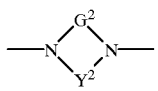

wherein $G^2$ is alkyl, aryl, or alkaryl, and $Y^2$ is alkyl.

29. A resin composition consisting essentially of:

a) at least one polyestercarbonate comprising structural units of the formula I:

(I)

wherein D is a divalent aromatic radical; and repeating or recurring structural units of the formula II:

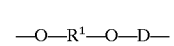
(II)

wherein D has the meaning previously ascribed to it and R$^1$ is at least one divalent moiety selected from those of the formulae III and IV:

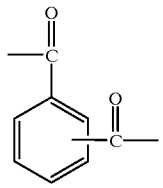 (III)

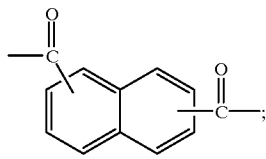 (IV)

b) at least one addition polymer; and
c) at least one phosphoryl compound having a glass transition point of at least about 0° C. of the formula V:

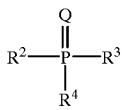 (V)

wherein R$^2$, R$^3$, and R$^4$ are each independently an alkoxy residue, aryloxy residue, or amine residue, or an aryloxy residue containing at least one alkyl substitution; and Q is oxygen or sulfur.

30. An article made from the composition of claim 1.

31. The article of claim 30 which is a deflection yoke for cathode ray tube, deflection yoke for television, slit type deflection yoke, mold coil deflection yoke, television backplate, docking station, pedestal, bezel, pallet, switch, switch housing, plug, plug housing, electrical connector, connecting device, socket, television housing, computer housing, desk-top computer housing, portable computer housing, lap-top computer housing, palm-held computer housing; monitor housing, printer housing, keyboard, FAX machine housing, copier housing, telephone housing, mobile phone housing, radio sender housing, radio receiver housing, light fixture, battery charger housing, battery housing, automotive electrical component, antenna housing, transformer housing, modem, cartridge, network interface device housing, circuit breaker housing, meter housing, panel for wet or dry appliance, dishwasher panel, clothes washer panel, clothes dryer panel, refrigerator panel; heating or ventilation enclosure, fan, air conditioner housing, cladding or seating for public transportation; or cladding or seating for trains, subways, or buses.

32. A method to increase the heat distortion temperature of a flame resistant composition containing an amount of a phosphoryl compound effective to render the composition a flame rating of at least V-2 in the Underwriter's Laboratory UL-94 protocol when measured on a test specimen of about 0.125 inch by about 0.5 inch by about 5 inch dimensions, wherein the method comprises combining:

a) at least one polyestercarbonate comprising structural units of the formula I:

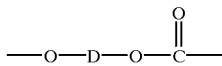 (I)

wherein D is a divalent aromatic radical; and repeating or recurring structural units of the formula II:

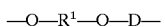 (II)

wherein D has the meaning previously ascribed to it and R$^1$ is at least one divalent moiety selected from those of the formulae III and IV:

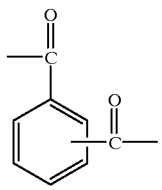 (III)

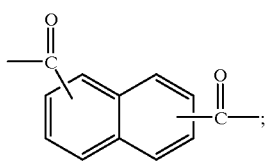 (IV)

b) at least one addition polymer; and
c) at least one phosphoryl compound having a glass transition point of at least about 0° C. of the formula V:

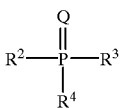 (V)

wherein Q is oxygen or sulfur; and R$^2$, R$^3$, and R$^4$ are each independently an alkyloxy, alkylthio, aryloxy, or arylthio residue, or an aryloxy or arylthio residue containing at least one alkyl or halogen substitution, or mixture thereof; or an amine residue.

33. The method according to claim 32 wherein D comprises units derived from bisphenol A.

34. The method according to claim 32 wherein D comprises units derived from 6,6'-dihydroxy-3,3,3',3'-tetramethyl-1,1'-spirobiindane.

35. The method according to claim 32 wherein R$^1$ comprises units derived from at least one of isophthalic acid, terephthalic acid, and naphthalene-2,6-dicarboxylic acid.

36. The method according to claim 32 wherein R$^1$ comprises units derived from a mixture of isophthalic acid and terephthalic acid.

37. The method according to claim 36 wherein the weight ratio of isophthalic acid to terephthalic acid is in the range of about 95:5 to about 5:95.

38. The method according to claim 37 wherein the weight ratio of isophthalic acid to terephthalic acid is in the range of about 93:7 to about 50:50.

39. The method according to claim 32 wherein the weight ratio of formula I units to formula II units is in the range of about 10:90 to about 90:10.

40. The method according to claim 39 wherein the weight ratio of formula I units to formula II units is in the range of about 20:80 to about 40:60.

41. The method according to claim 32 wherein the addition polymer is a copolymer of an alkenylaromatic compound.

42. The method according to claim 41 wherein the alkenylaromatic compound is styrene.

43. The method according to claim 42 wherein the addition polymer is at least one styrene-acrylonitrile copolymer.

44. The method according to claim 43 wherein the addition polymer is a combination of two styrene-acrylonitrile copolymers.

45. The method according to claim 44 wherein one of the styrene-acrylonitrile copolymers is an ABS copolymer.

46. The method according to claim 32 which comprises about 55–95% by weight polyestercarbonate portion and about 5–45% by weight addition polymer, based on total resinous constituents.

47. The method according to claim 32 wherein the phosphoryl compound comprises at least one member selected from the group consisting of phosphate esters and phosphoramides.

48. The method according to claim 47 wherein the phosphoryl compound is a phosphoramide of the formula XII:

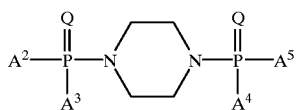

(XII)

wherein each Q is independently oxygen or sulfur; and each of $A^{2-5}$ is a 2,6-dimethylphenoxy moiety or a 2,4,6-trimethylphenoxy moiety.

49. The method of claim 48 wherein the phosphoryl compound is a phosphoramide of the formula VI:

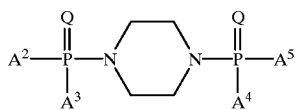

(XII)

wherein Q is oxygen; and each of $A^{2-5}$ is a 2,6-dimethylphenoxy moiety.

50. The method of claim 32 wherein the phosphoryl compound comprises at least one phosphoramide having a glass transition point of at least about 0° C.

51. The method of claim 50 wherein all of the phosphoramide has a glass transition point of at least about 0° C.

52. The method of claim 32 wherein $R^2$ is of the formula XVI:

(XVI)

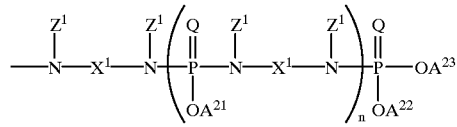

wherein
each Q is independently oxygen or sulfur;
each of $A^{21-23}$ is independently an alkyloxy, alkylthio, aryloxy, or arylthio residue, or an aryloxy or arylthio residue containing at least one alkyl substitution; or an amine residue;

each $Z^1$ is an alkyl radical, aromatic radical, or aromatic radical containing at least one alkyl substitution;

each $X^1$ is an alkylidene radical, aromatic radical, or aromatic radical containing at least one alkyl substitution;

n is from 0 to about 5; and $R^3$ and $R^4$ are each independently an alkyloxy, alkylthio, aryloxy, or arylthio residue, or an aryloxy or arylthio residue containing at least one alkyl substitution; or an amine residue.

53. The method of claim 32 wherein $R^2$ is of the formula XI:

(XVII)

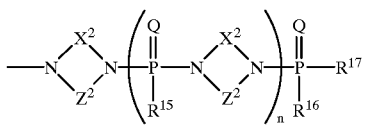

wherein each Q is independently oxygen or sulfur;

each $X^2$ is alkylidene, aryl, or alkaryl;

each $Z^2$ is alkylidene;

each of $R^{15}$, $R^{16}$, and $R^{17}$ is independently an alkyloxy residue, an aryloxy residue, an aryloxy residue containing at least one alkyl substitution, or an amine residue; and n is from 0 to about 5; and $R^3$ and $R^4$ are each independently an alkyloxy, alkylthio, aryloxy, or arylthio residue, or an aryloxy or arylthio residue containing at least one alkyl substitution; or an amine residue.

54. The method of claim 32 wherein at least one phosphoryl compound is present in an amount effective to render the resin composition a flame rating of V-0, V-1, or V-2 in the Underwriters Laboratory UL-94 protocol when measured on a test specimen of about 0.125 inch by about 0.5 inch by about 5 inch dimensions.

55. The method of claim 32 wherein the total amount of phosphorus per 100 parts of resinous materials is in the range of about 0.1–3 parts by weight.

56. The method of claim 32 wherein the composition has a flame rating of least V-1.

57. The method of claim 32 wherein the composition has a flame rating of least V-0.

58. The method of claim 32 in which the composition is essentially free of chlorine and bromine.

59. The flame retardant composition which is made by the method of claim 58.

60. The flame retardant composition which is made by the method of claim 32.

61. A resin composition comprising the following and any reaction products thereof:

a) at least one polyestercarbonate comprising structural units of the formula I:

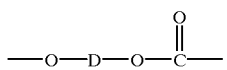
(I)

wherein D is a divalent aromatic radical; and repeating or recurring structural units of the formula II:

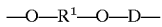
(II)

wherein D has the meaning previously ascribed to it and $R^1$ is at least one divalent moiety selected from those of the formulae III and IV:

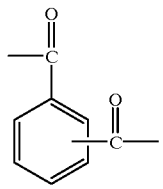
(III)

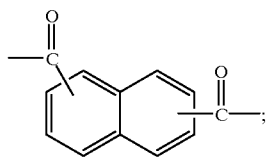
(IV)

b) at least one addition polymer; and
c) a phosphoramide having a glass transition point of at least about 20° C. of the formula XII:

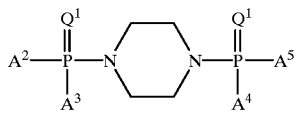
(XII)

wherein each $Q^1$ is oxygen; and each A moiety is a 2,6-dimethylphenoxy moiety.

62. The composition according to claim 61 wherein D comprises units derived from bisphenol A.

63. The composition according to claim 61 wherein $R^1$ comprises units derived from at least one of isophthalic acid, terephthalic acid, and naphthalene-2,6-dicarboxylic acid.

64. The composition according to claim 61 wherein the addition polymer is a copolymer of an alkenylaromatic compound.

65. The composition according to claim 64 wherein the alkenylaromatic compound is styrene.

66. The composition according to claim 65 wherein the addition polymer is at least one styrene-acrylonitrile copolymer.

67. The composition according to claim 66 wherein the addition polymer is a combination of two styrene-acrylonitrile copolymers.

68. The composition according to claim 67 wherein one of the styrene-acrylonitrile copolymers is an ABS copolymer.

69. A method to increase the heat distortion temperature of a flame resistant composition containing an amount of a phosphoryl compound effective to render the composition a flame rating of at least V-2 in the Underwriter's Laboratory UL-94 protocol when measured on a test specimen of about 0.125 inch by about 0.5 inch by about 5 inch dimensions, wherein the method comprises combining:

a) at least one polyestercarbonate comprising structural units of the formula I:

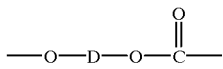
(I)

wherein D is a divalent aromatic radical; and repeating or recurring structural units of the formula II:

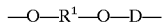
(II)

wherein D has the meaning previously ascribed to it and $R^1$ is at least one divalent moiety selected from those of the formulae III and IV:

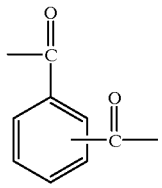
(III)

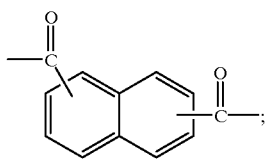
(IV)

b) at least one addition polymer; and
c) a phosphoramide having a glass transition point of at least about 20° C. of the formula XII:

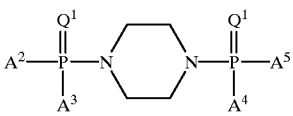
(XII)

wherein each $Q^1$ is oxygen; and each A moiety is a 2,6-dimethylphenoxy moiety.

70. The method according to claim 69 wherein D comprises units derived from bisphenol A.

71. The method according to claim 69 wherein $R^1$ comprises units derived from at least one of isophthalic acid, terephthalic acid, and naphthalene-2,6-dicarboxylic acid.

72. The method according to claim 69 wherein the addition polymer is a copolymer of an alkenylaromatic compound.

73. The method according to claim 72 wherein the alkenylaromatic compound is styrene.

74. The method according to claim 73 wherein the addition polymer is at least one styrene-acrylonitrile copolymer.

75. The method according to claim 74 wherein the addition polymer is a combination of two styrene-acrylonitrile copolymers.

76. The method according to claim 75 wherein one of the styrene-acrylonitrile copolymers is an ABS copolymer.

* * * * *